(12) United States Patent
Nunnink

(10) Patent No.: US 8,675,208 B2
(45) Date of Patent: Mar. 18, 2014

(54) LASER PROFILING ATTACHMENT FOR A VISION SYSTEM CAMERA

(75) Inventor: Laurens Nunnink, Simpleveld (NL)

(73) Assignee: Cognex Corporation, Natick, MA (US)

(*) Notice: Subject to any disclaimer, the term of this patent is extended or adjusted under 35 U.S.C. 154(b) by 119 days.

(21) Appl. No.: 13/468,704

(22) Filed: May 10, 2012

(65) Prior Publication Data

US 2013/0301058 A1    Nov. 14, 2013

(51) Int. Cl.
*G01B 11/30* (2006.01)
(52) U.S. Cl.
USPC .......................................... 356/602; 356/606
(58) Field of Classification Search
USPC ................. 356/601–623; 345/419; 372/18
See application file for complete search history.

(56) References Cited

U.S. PATENT DOCUMENTS

| | | | |
|---|---|---|---|
| 4,591,996 A | 5/1986 | Vachon | |
| 5,001,324 A * | 3/1991 | Aiello et al. | 219/121.63 |
| 7,253,908 B2 | 8/2007 | Vaccaro et al. | |
| 7,286,697 B2 | 10/2007 | Guetta | |
| 7,507,940 B2 | 3/2009 | Fournier et al. | |
| 7,724,379 B2 | 5/2010 | Kawasaki et al. | |
| 7,808,481 B2 | 10/2010 | Lan | |
| 8,035,823 B2 | 10/2011 | Keightley et al. | |
| 8,082,120 B2 | 12/2011 | St-Pierre et al. | |
| 2006/0017720 A1* | 1/2006 | Li | 345/419 |
| 2006/0232787 A1* | 10/2006 | Hoffmann et al. | 356/602 |
| 2013/0051411 A1* | 2/2013 | Kim et al. | 372/18 |

* cited by examiner

*Primary Examiner* — Hoa Pham
(74) *Attorney, Agent, or Firm* — Loginov & Associates, PLLC

(57) ABSTRACT

This invention provides a system and method for laser profiling that simplifies the task of setting up and using laser profiling systems and associated applications by providing a profiler assembly that includes a predetermined arrangement of lens and spaced-apart laser in which the geometry and calibration parameters are predetermined. The profiler assembly is adapted to mount directly into the camera mount (typically threaded) of a conventional vision system camera. All components needed to perform the profiling task can be integrated into the profiler assembly. The integration of components in a single interchangeable/exchangeable assembly makes it straightforward to optimize/adapt the assembly for a particular profiling application.

21 Claims, 10 Drawing Sheets

LASER PROFILING ATTACHMENT FOR A VISION SYSTEM CAMERA

FIELD OF THE INVENTION

This invention relates to vision system cameras and more particularly to vision system cameras adapted to image surface profiles.

BACKGROUND OF THE INVENTION

A laser beam profiler (alto termed simply a "laser profiler") captures and determines the spatial intensity profile of a laser beam at a particular plane transverse to the beam propagation path. The camera resides above the plane and the camera lens axis resides at an acute angle relative to the plane. Laser profilers are useful in a wide range of inspection and manufacturing operations where the user desires to measure and characterize surface details of a planar object via triangulation. One example is the inspection of keyboards in which the profiling task determines whether all keys are at a similar height. One form of laser profiler uses a vision system camera having an image sensor (or "imager") that can be based upon a CCD or CMOS design. The imager defines a predetermined field of grayscale or color-sensing pixels on an image plane that receive focused light from an imaged scene through a lens. The profiler uses a particular lens assembly that directs reflected laser light from the planar scene to the sensor at an acute angle with respect to the camera sensor's optical axis (which is perpendicular to the image plane). In this manner, the non-perpendicular angle between the laser axis, lens axis and sensor's image plane can fulfill the so-called Scheimpflug principle so as to define a sharp image of the laser line at every measurement distance (described further below). That is, normally when a camera axis is directed at a non-perpendicular angle to a planar scene, only a small crossing width of the overall height of the acquired image is in sharp focus and the focus fades above and below this region.

A significant challenge to performing accurate laser profiling is that the relative angles of the laser axis with respect to the lens axis should be highly accurate. Likewise the distance between the spaced-apart laser and the lens should be known to a high degree of accuracy. Setting up a an arrangement of mounting fixtures for the camera and laser, and then calibrating this arrangement is time consuming and can lead to variability in the system's overall accuracy and performance.

It is therefore desirable to provide a laser profiling system for use with a vision system camera that allows for accurate and repeatable setup of a laser profiling arrangement with reduced time and effort.

SUMMARY OF THE INVENTION

This invention overcomes disadvantages of the prior art by providing a system and method for laser profiling that simplifies the task of setting up and using laser profiling systems and associated applications by providing a profiler assembly that includes a predetermined arrangement of lens and spaced-apart laser in which the geometry and calibration parameters are predetermined. The profiler assembly is adapted to mount directly into the camera mount (typically threaded) of a conventional vision system camera. All components needed to perform the profiling task can be integrated into the profiler assembly. The integration of components in a single interchangeable/exchangeable profiler assembly makes it straightforward to optimize/adapt the assembly for a particular profiling application.

In an illustrative embodiment, an assembly for laser profiling an object surface using a vision system camera having a mount coaxial with a camera axis, the assembly is provided. The assembly includes a lens base, which includes a lens having a lens optical axis, the lens base also includes a rear end having a mounting structure constructed and arranged to removably secure the lens base to the mount in a predetermined rotational orientation with respect to the camera axis. A bar extends from the lens base to a distal end. The distal end is constructed and arranged to support a laser so that an axis of projection of the laser is directed in a predetermined direction with respect to the lens optical axis. The assembly can be part of a laser profiling system that includes a vision system camera having (illustratively) a conventional mount that allows for interchange with at least a second integral laser profiler assembly. The two laser profiler assemblies can define dissimilar geometries—e.g. the focal distances, lens types and/or relative angles of the lens axis and laser axis of projection can be dissimilar for dissimilar profiling tasks.

Illustratively, the lens optical axis is oriented at an acute angle with respect to the camera axis. The rear end can include a slidably mounted mounting ring that threads into the camera mount. Likewise, the rear end is externally threaded and includes a focal ring located rearwardly of the mounting ring. The focal ring threadingly engages external threads of the rear end to allow for variable axial positioning thereof. This provides a stop when the mounting ring is tightened against a radially inward wall of the mount. In this manner, setting the axial position of the focal ring along the rear end provides the desired focal distance between the lens and the camera sensor's image plane. In an embodiment the lens base and the bar comprise a unitary structure of a low-thermal-expansion material.

In an illustrative embodiment, a method for arranging a laser profiler comprises providing a vision system camera having a mount coaxial with a camera axis and a sensor with an image plane perpendicular to the camera axis. A first integral profiler assembly is removably mounted to the camera mount. This assembly includes a lens base and a bar with a laser at a distal end in which a lens optical axis and an axis of projection of the laser are spaced apart along the bar. In removably mounting the assembly a mounting structure of the first integral profiler assembly is threadingly engaged with the camera mount by a mounting ring that slides along a rear end of the lens base.

In another step the method includes transmitting geometrical data and calibration parameters relative to the attached integral laser profiler assembly to a vision system processor operatively connected with the vision system camera so that vision system processes associated with the profiling task can employ the data in performing the profiling task.

BRIEF DESCRIPTION OF THE DRAWINGS

The invention description below refers to the accompanying drawings, of which.

DETAILED DESCRIPTION

Figure 1:
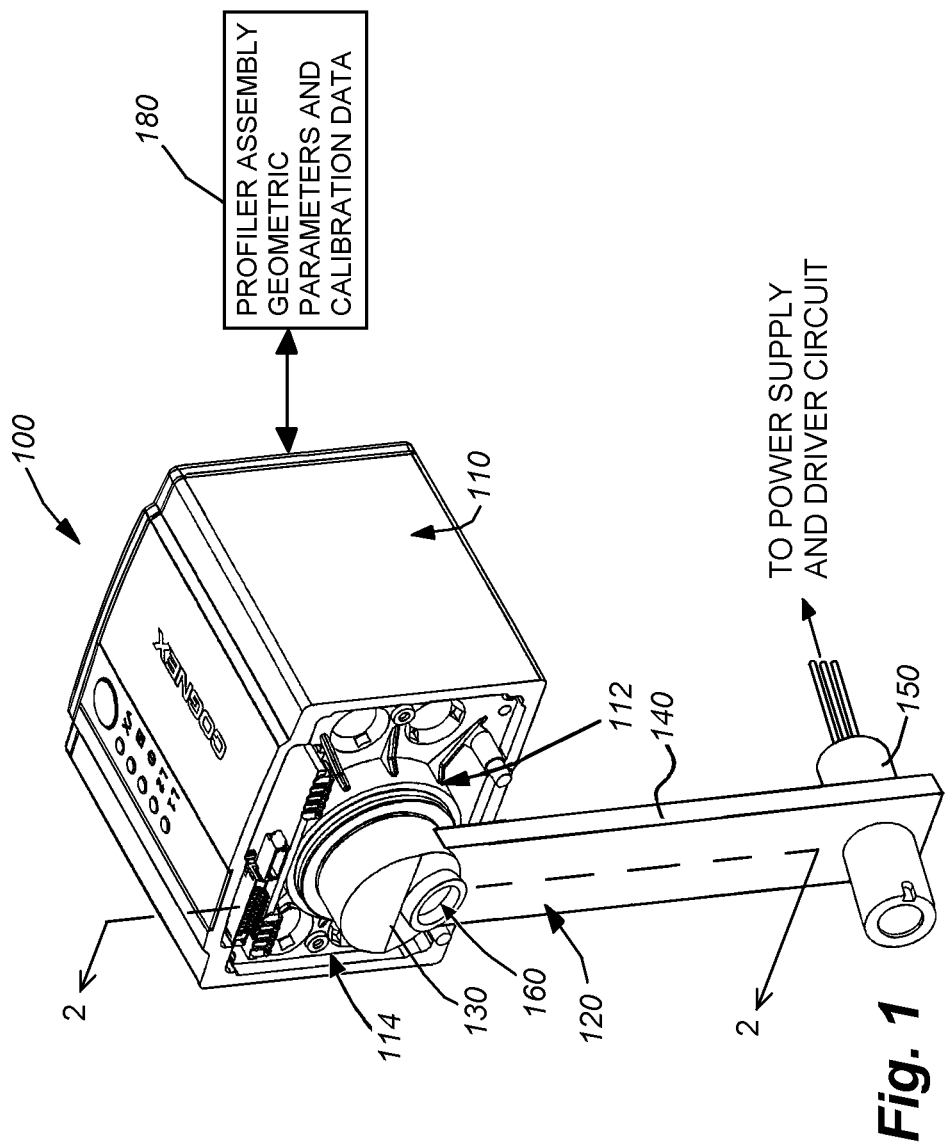
FIG. 1 is a perspective view of a laser profiling system including a laser profiler assembly according to an illustrative embodiment attached to an exemplary vision system camera mount.

FIG. 1 shows a laser profiling system 100 according to an illustrative embodiment. The system includes an exemplary vision system camera unit 110 that can be any acceptable camera having an image sensor with (illustratively) a two-dimensional array of image pixels. The camera 110 can be a "smart" camera with an internal processor that performs some or all a plurality of vision system tasks (e.g. edge-detection, blob analysis, rotation and scale-invariant search, etc.), such as the Insight system available from Cognex Corporation of Natick, Mass. Alternatively, the camera can possess fewer processing functions, and transmit captured images (via a wired or wireless link) to a remote processing device, such as a personal computer (PC) with appropriate vision system software installed (not shown). Note, as used herein, any processes or procedures can be performed by electronic hardware, software consisting of a non-transitory computer-readable medium of program instructions or a combination of hardware and software.

The camera 110 includes a lens mounting base (or "mount") 112 on the front face 114 of its body, which can be a can be a conventional threaded mount, such as a C mount, a CS mount or an F mount. The camera body's exemplary C mount structure 112 employs a conventional 1-inch inner diameter internal thread that is known to those in the art. With reference also to the cross sectional view of FIG. 2, the exemplary camera 110 includes a conventional sensor 210 that defines an image plane SP and perpendicular camera optical axis COA. The sensor is part of a circuit board assembly 212 that is interconnected with further processing and interface components 216 and 218 according to an exemplary camera arrangement. The specific implementation and function of these circuit and processing components is highly variable. In general, the position of the sensor 210 and associated image plane SP is relevant to the teachings of the illustrative embodiments, and more particularly with respect to the attached, illustrative laser profiler assembly 120.

The laser profiler assembly 120 consists of a lens base 130, arm 140 and laser 150, which is mounted at a distal/remote end of the arm 140 relative to the lens base 130. In an illustrative embodiment, the lens base 130 is formed unitarily with the arm as a casting or a machined (from a solid billet) structure for rigidity. In an embodiment, the structure can be formed from a low-thermal-expansion material, such as Invar alloy. Other low-thermal-expansion materials with sufficient strength and rigidity can be substituted in accordance with skill in the art. In this manner, the heating of the camera and/or ambient variations in temperature do not appreciably lengthen or shorten the bar 140. This ensures that the assembly remains dimensionally stable during calibration and use, as described further below.

The lens base 130 houses an appropriately sized lens assembly 160 that defines a lens optical axis LOA (FIG. 2), which is (illustratively) directed downwardly at an acute angle AA with respect to the sensor/camera optical axis COA. In an embodiment, the angle AA is approximately 13 degrees, but a wide range of potential angles for AA (e.g. approximately 5-45 degrees) are expressly contemplated. The laser assembly 150 comprises a generally conventional semiconductor (e.g. visible diode) laser having a beam that can define a projected diverging line that fans out along the horizontal direction (described further below with reference particularly to FIG. 2A). The laser's projection axis LA is upwardly angled (angle AL) with respect to the vertical axis VAB of the bar 140. This allows the laser to be located in line with a planar object surface (being profiled) and for the camera to reside at a predetermined distance above the scene with light from the scene returning to the lens 160 in alignment with the lens optical axis LOA. In an embodiment, the height HB of the bar, taken between the laser axis LA and the camera optical axis COA is approximately 5 to 20 centimeters and the associated angle AL is approximately 80 degrees. The height HB is approximately 8-9 centimeters in the illustrative embodiment. A more specific value of this height in an illustrative embodiment is described further below with reference to FIG. 3. This geometry creates an illustrative angle ALPHA between the lens optical axis LOA and laser axis LA of approximately 25 degrees and can illustratively vary between approximately 5 degrees and 50 degrees in other embodiments. These geometric parameters are highly variable in alternate embodiments. More generally, the mount 112 and assembly lens base 130 are arranged coaxially with the camera axis COA, which is perpendicular to the image plane at the sensor 210. The lens 160 typically defines a lens optical axis LOA at the acute angle AA with respect to the camera axis COA.

Note, as used herein, various directional and orientation terms such as vertical, horizontal, up, down, bottom, top, side, front, rear, and the like are used only as relative conventions, and not as absolute orientations with respect to a fixed coordinate system, such as gravity.

Figure 2:
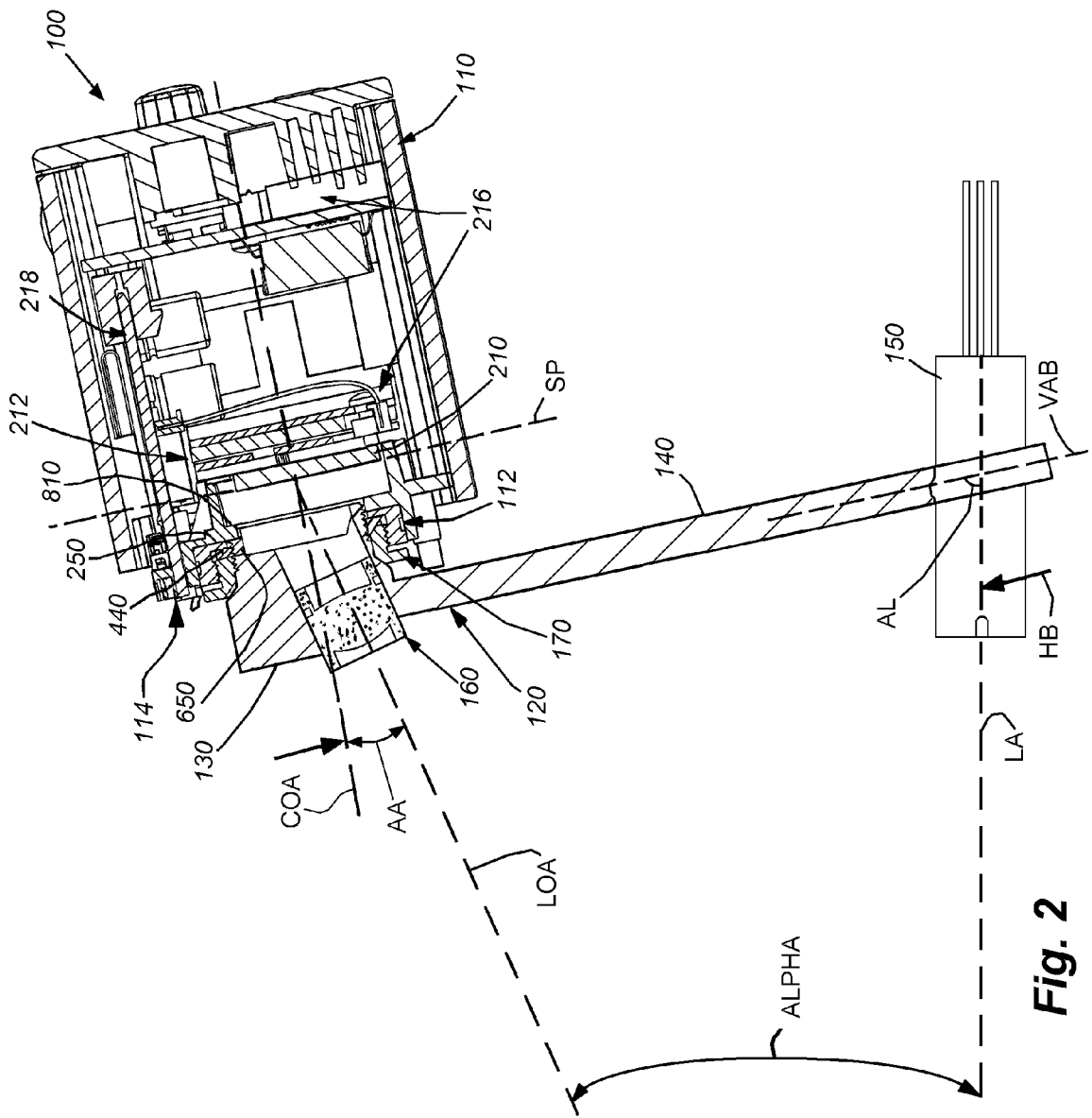
FIG. 2 is a partial side cross section of the system taken along line 2-2 of FIG. 1.
Figure 2A:
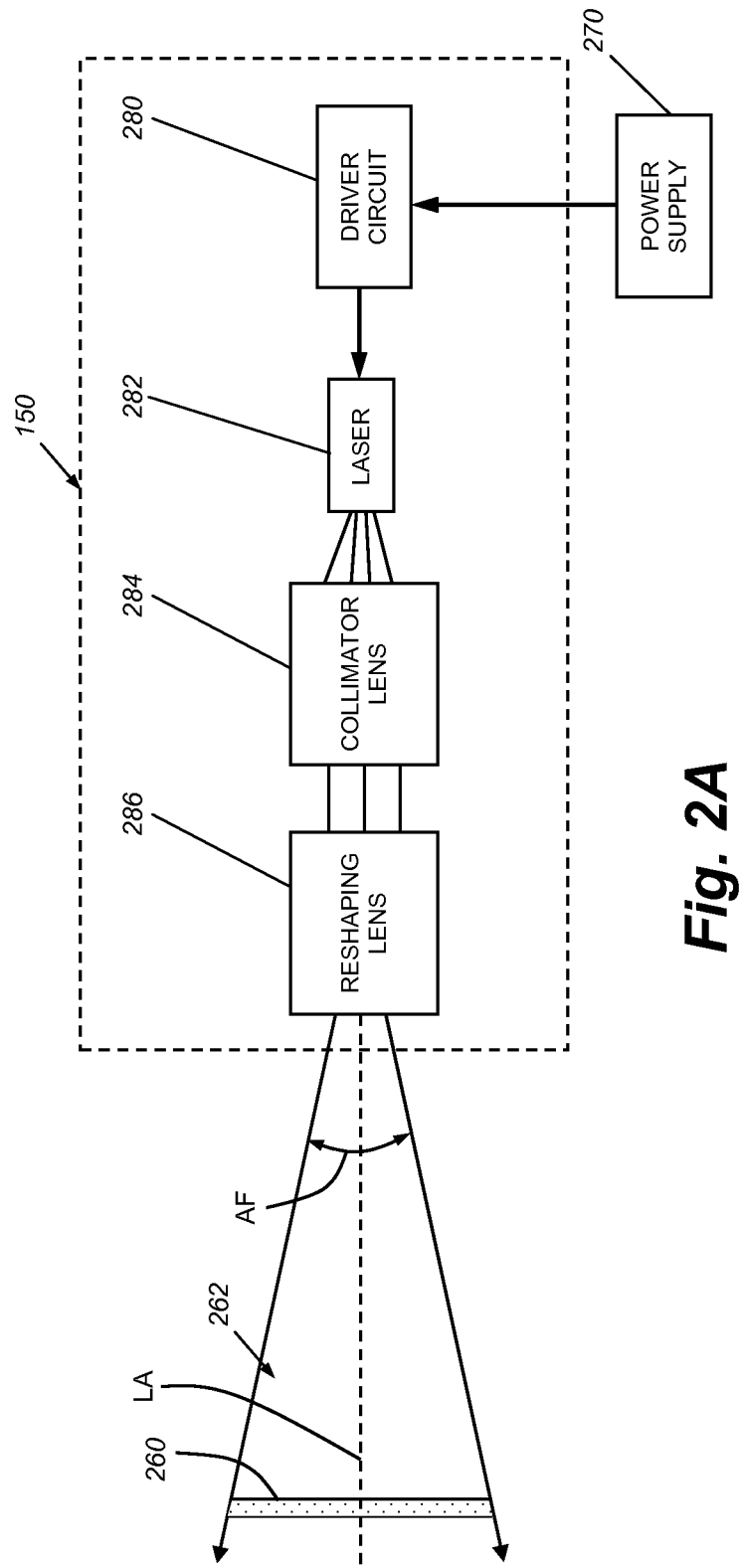
FIG. 2A is a schematic top view of an illustrative laser assembly that generates a diverging beam fan for use in the laser profiler assembly of FIG. 1.

With further reference to FIG. 2A, the laser assembly consists of a plurality of components that generate a diverging "line" of laser light from the emitting tip of the assembly. This line (represented as element 260) resides within a plane perpendicular to the plane of the cross section of FIG. 2 (i.e. a line in a plane perpendicular to a plane defined by the lens optical axis LOA and the laser axis LA that also contains the laser axis LA), and spreading out in a fan 262 as shown so that the line increases in length at greater distances from the laser assembly 150. In an embodiment, the fan 262 is generally symmetrical about the laser axis LA, and the fan angle AF is approximately 30 degrees. The angle AF can vary in illustrative embodiments. The laser assembly 150 (shown as a dashed-line box) is powered by an appropriate power supply 270 that energizes an electronic laser diode driver circuit 280. These components 270, 280 can be of conventional design. The power supply 270 can be mounted on/in the laser assembly 150, or typically is provided as a separate unit that is powered by wall current and operatively interconnected to the assembly using one or more leads/wires. Battery power can also be employed to power the laser in various embodiments. The driver circuit 280 drives the operation of the laser diode 282 in a conventional manner. The laser diode 282 can be any acceptable unit transmitting laser light in a visible or nearly visible wavelength. The beam emitted by the laser diode 282 diverges as it enters a collimator lens 284. The collimator lens 284 includes conventional optics that collimates the diverging beam. The transmitted beam is then received by a reshaping lens (or other optical component), which generates the diverging beam fan 262 from the collimated beam. The reshaping lens can comprise a variety of optical devices (or combination of discrete devices) including, but not limited to, a cylindrical lens, holographic element, or so-called Powell lens.

Figure 3:
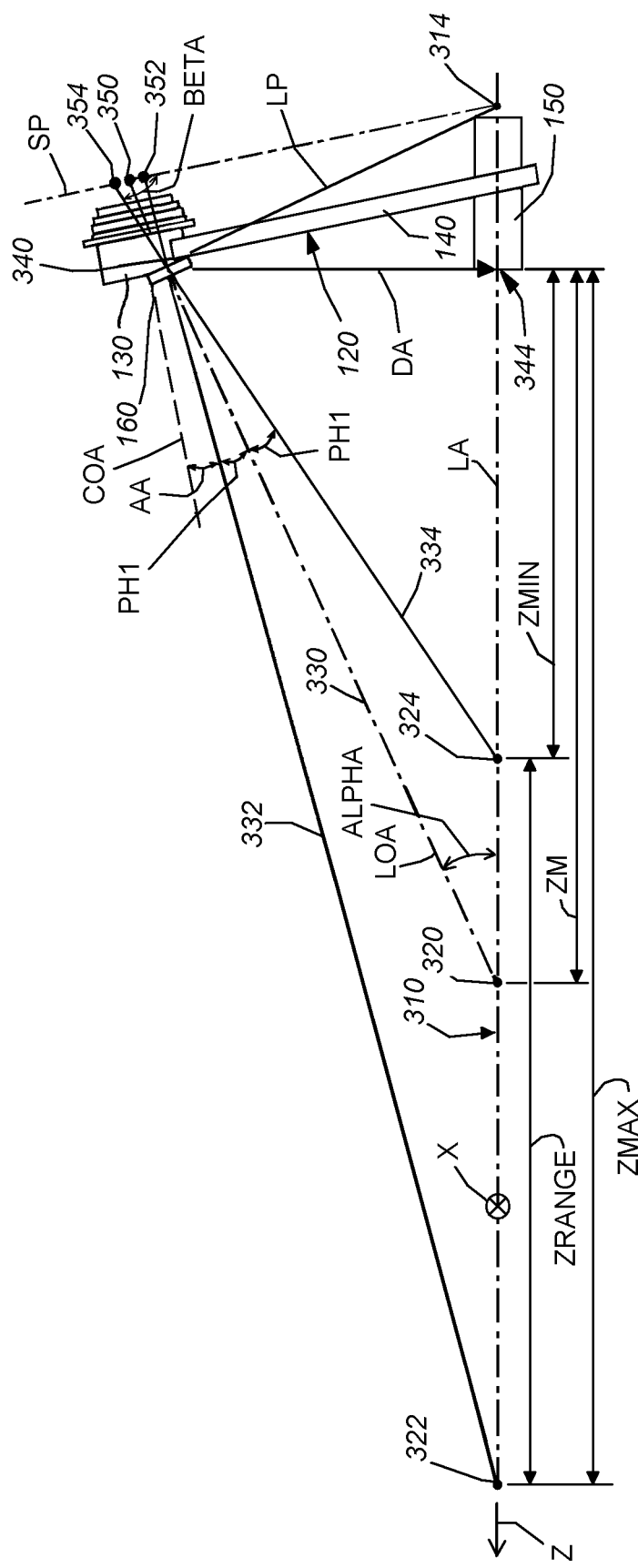
FIG. 3 is a fragmentary side view of the profiler assembly of FIG. 1 illustrating the operation of the Scheimpflug principle in acquiring an image from a scene aligned with the laser axis and focusing the image via an angled lens onto the image plane of the camera sensor.
Figure 4:
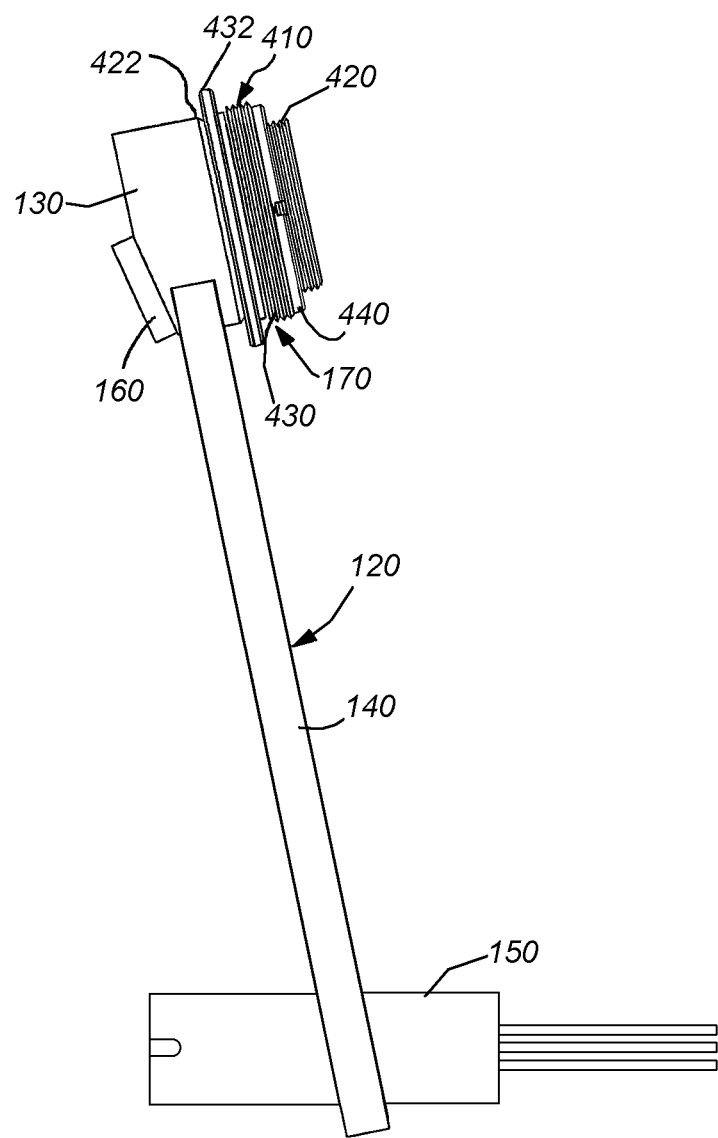
FIG. 4 is a side view of the profiler assembly of FIG. 1.
Figure 5:
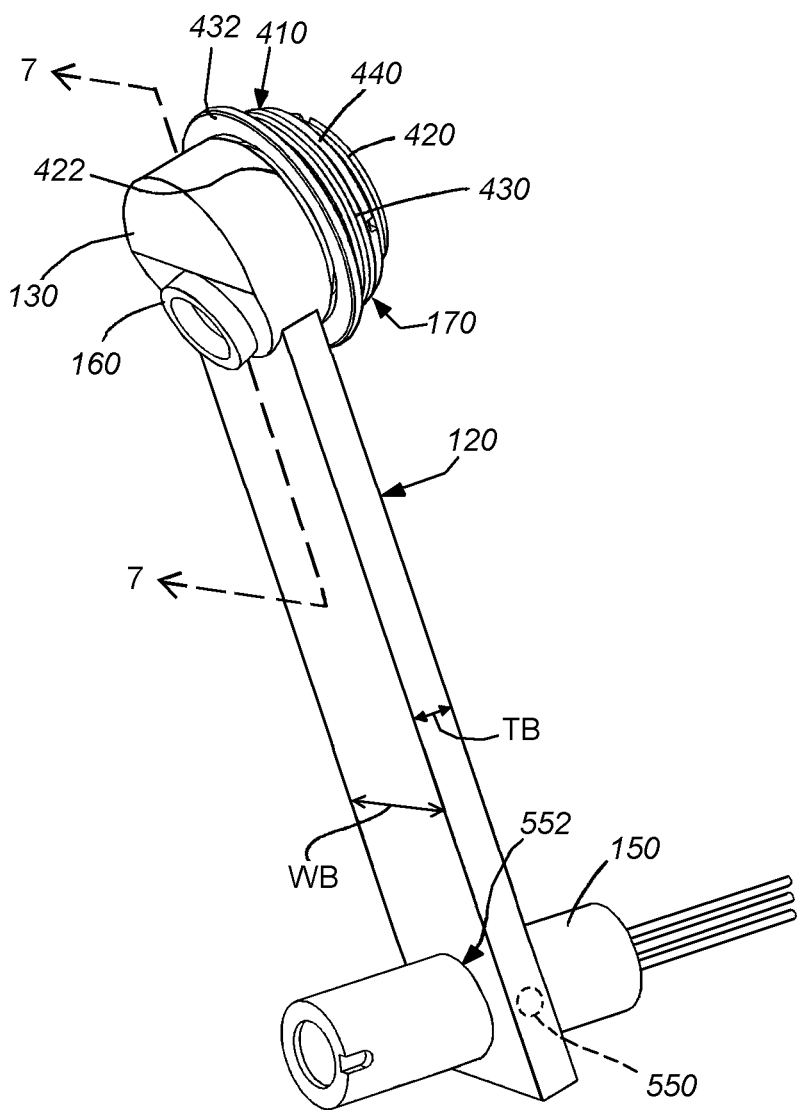
FIG. 5 is a front perspective view of the profiler assembly of FIG. 1.
Figure 6:
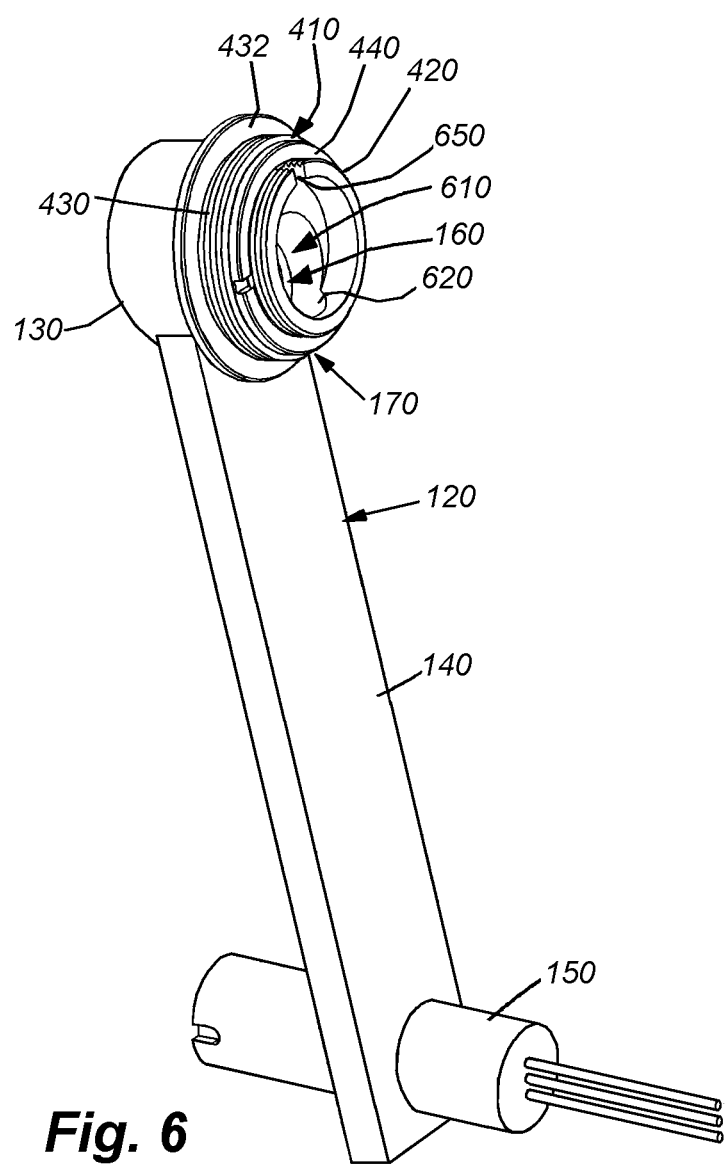
FIG. 6 is a rear perspective view of the profiler assembly of FIG. 1.

With reference to FIG. 3, the angled lens profiler assembly 120 is shown satisfying the Scheimpflug principle. In many typical imaging applications, the lens plane (perpendicular to the lens optical axis LOA) and image or sensor plane SP are parallel, and the plane of focus (PoF) is parallel to the lens and image planes. If a planar subject (e.g. the side of a building) is also parallel to the image plane, it can coincide with the PoF, and the entire subject can be rendered sharply. However, if the subject plane is not parallel to the image plane, as shown in FIG. 3, then a typical camera arrangement having coaxially aligned lens and camera optical axes (LOA and COA—i.e. a parallel lens plane and image plane) will be in true focus only along a line where it intersects the PoF. However, according to the Scheimpflug principle when an oblique tangent line is extended from the image plane (SP in FIG. 3), and another is extended from the lens plane (LP in FIG. 3), these lines meet at a line (310 in FIG. 3) through which the PoF also passes. This intersection point 314 known as the Scheimpflug intersection. Based upon the principle a planar surface that is not parallel to the image plane can be completely in focus across a given field of view.

The object surface (being profiled 310) resides along the line of the laser axis LA. Various points 320, 322, 324 in the vertical field of view are shown along the surface 310. These points 320, 322 and 324 are associated with respective crossing rays 330 (LOA), 332 and 334 of varying length. The rays 330, 332, 334 also strike the image plane of the sensor SP at points 350, 352 and 354 on the opposing side of the crossing point 340 (i.e. the imager entrance pupil). In an exemplary embodiment, appropriate (well known) computations are made to implement the Scheimpflug principle using an exemplary sensor that defines a rectangular area of approximately 10.32×7.74 millimeters. The focal length of the lens from the crossing point 340 (and lens plane LP) to the sensor image plane SP is approximately 21.2 millimeters. The distance DA between the crossing point 340 on the lens optical axis LOA and the laser axis LA at the emitter end 344 of the assembly is approximately 88.59 millimeters. The relative angle BETA between the lens optical axis LOA and sensor image plane SP is approximately 77.1 degrees. As described above, the angle ALPHA between the lens optical axis LOA and the laser axis LA is approximately 25 degrees. The rays 332 and 334 respectively define the maximum field of view and working range taken along the Z direction (arrow Z). Based upon the exemplary parameters described above, the rays 332 and 334 each define a relative angle of approximately 9.6 degrees on either side of the lens optical axis LOA. This provides a maximum viewing distance on the surface (from ray DA through the crossing point 340) ZMAX of approximately 321.04 millimeters and a minimum distance ZMIN of approximately 128.55 millimeters, with the middle of the distance ZM at approximately 189.98 millimeters from ray DA. This provides an overall working range in the Z direction of approximately 129-321 millimeters (110-115 millimeters from the camera enclosure) with a distance ZRANGE along the object surface of approximately 192.49 millimeters. Between points 324 and 322 the range in the X direction (axis X, shown perpendicular to the plane of the page) diverges from approximately 65.74 millimeters to 162.25 millimeters (an X distance of 97 millimeters). Thus, the Z distance over the range is more than twice that of the X distance, but remains in focus due to the principle. As described further below, the angles and geometry described in this embodiment are illustrative of a wide range of values, depending upon the specific profiling task and desired triangulation parameters. For example, the angle ALPHA between the laser axis LA and lens optical axis LOA can vary between approximately 5 degrees and 50 degrees. Likewise, the depicted distance D between the lens optical axis LOA and the laser axis LA can vary between approximately 5 and 20 centimeters. Additionally, the focal length of the lens (which defines the measurement range of the camera system) can vary between approximately 7 and 50 millimeters. The appropriate arrangement of components in a profiler assembly according to embodiments herein can be determined by application of known computations using values for these three characteristics.

In an illustrative embodiment, the lens 160 can comprise a conventional, low-distortion, large-aperture type having an approximate diameter of 5 millimeters. It is mounted within the lens base 130 by M12×0.5 threads. A variety of other lens arrangements can be provided including arrangements that include prismatic components (not shown) to bend light from one axis to another non-parallel axis. More particularly, the lens parameters and the geometry of the assembly (i.e. angle of the lens axis relative to the camera axis, angle of the laser axis, spacing between axes) can vary depending upon the particular profiling task. In some tasks the focal distance can be from 10 centimeters to ammeter. In other tasks, the focal distance can be only a few centimeters or less for high-precision measurement tasks. The assembly can be purpose-built for the desired focal distance and level of precision and a wide range of profiler assembly models can be made available from the manufacturer depending upon the task. All assemblies can be interchangeably mounted to a given vision system camera.

In the illustrative embodiment, the lens 160 is fixed within the lens base in an embodiment so that focal distance is generally provided by the lens base's threaded mounting structure 170. This structure 170 is described in greater detail with reference to FIGS. 4-7, collectively. The mounting structure 170 includes external threads 410 that mate with the internal threads of the mounting base 112 (as shown in FIG. 2). In the illustrative embodiment, the external threads 410 and internal threads 112 are arranged according to a conventional C mount configuration, but other conventional or non-conventional mount arrangements are expressly contemplated in alternate embodiments. The use of a C mount (or CS mount) base allows the assembly 120 to be swapped with another type of lens if desired, allowing for re-tasking of a camera for a different function.

Figure 7:
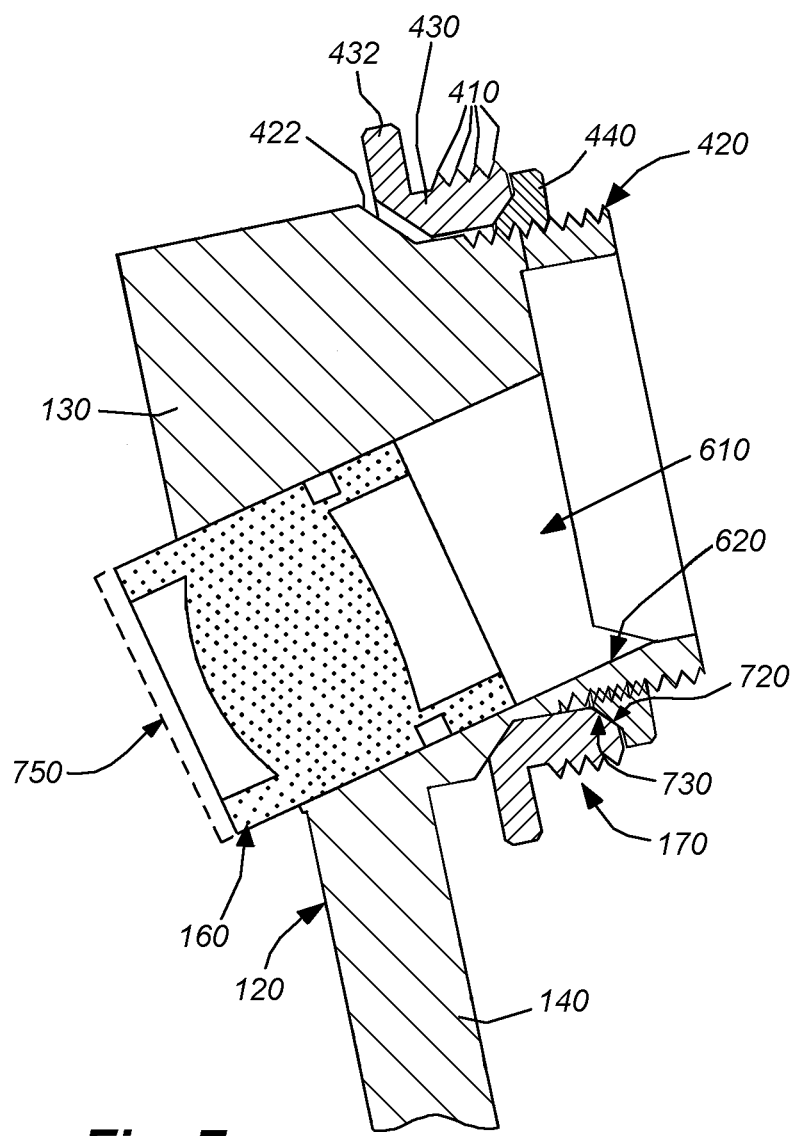
FIG. 7 is a partial cross section of the profiler assembly taken along line 7-7 of FIG. 5.

As shown, the lens base 130 includes a unitary, externally threaded, rear end 420 with threads that extend forward to a back shoulder 422. The back shoulder is chamfered as shown in FIG. 7. The threaded end 420 includes a M20×0.75 thread in an illustrative embodiment, but this geometry is highly variable in alternate embodiments. In general the thread size is chosen, in part to enable a sufficiently large (angled) internal opening 610 to allow light from the lens 160 to fully cover the sensor without interrupting the external thread. Note in FIG. 6 that the bottom of the inner race of the end 420 includes a dished-out ramp to provide a full cylinder on the rear side of the lens 160. The external dimension of the rear end's threads is also chosen to allow the rearmost portion of the rear end 420 to pass through the orifice formed by the radially inwardly directed wall 250 (FIG. 2) at the rear end of the mount 112. In other words, the outer diameter of the rear end 420 is at least slightly smaller than the inner diameter of the mount's rear internal wall 250.

With reference to FIG. 7, the lens system can include an appropriate band pass filter 750 (shown in phantom as an optional attachment or coating) that attenuates wavelengths of light other than that of the laser. In this manner, the system images only the illuminated features of the viewed scene.

The threaded end 420 supports two threaded components. The mounting ring 430, which includes the external C mount threads 410, is provided forward on the end, confronting the shoulder 422. The ring includes a front flange 432 that is (optionally) chamfered to mate with the shoulder 422 and provides a convenient structure for the user to grasp and rotate when adjusting the axial position of the mounting ring 430 with respect to the threaded end 420 (and associated lens base 130). The threaded end 420 also supports a focal ring 440 that confronts the rear side of the mounting ring 430. Notably, the mounting ring 430 is unthreaded internally and slidably rides upon the rear end 420 of the lens base 130. Conversely, the focal ring 440 is internally threaded to mate with the external threads of the rear end 420. The focal ring 440 is thus adapted to engage the radially inwardly directed wall (250 in FIG. 2) on the rear end of the threaded camera lens mount 112. The user moves the focal ring to an axial position along the end 420 that provides a desired focus at the sensor when the rear side of the focal ring abuts the radially inward wall 250 of the lens mount 112. The rear end 720 (FIG. 7) of the mounting ring 430 and front end 730 of the focal ring 440 each define mating frustoconical surfaces that provide a secure, aligned engagement when these two components are drawn together. The mounting ring 430, thus, acts as a lock when it is rotated into the camera mount 112.

To attach the profiler assembly to the camera the user positions the focal ring 440 (or the focal ring comes pre-positioned) at an axial position along the rear end 420 that provides the best focus for the imaged scene upon the sensor. This can entail fixing the camera with respect to the scene and applying the lens base to the camera mount while viewing the resulting acquired image on a display. Once the focal ring 440 is positioned at the appropriate axial provision so that when it abuts the radially inward wall 250 of the mount, proper focus is achieved, the mounting ring 430 can be fully tightened within the mount 112. In that manner the engagement between the mounting ring's external threads and the camera mount's internal threads causes the focal ring 440 to pressurably bear against the mount 112. This axial pressure thereby causes the assembly 120 to remain firmly engaged with respect to the camera body free of any rotation or axial movement. Because the mounting ring 430 is freely rotatable (being unthreaded) with respect to the rear end 420, the desired vertically downward-extended position of the assembly's bar 140 and laser 150 can be maintained as the mounting ring 430 is rotated to a fully tightened position. Note that both the mounting ring 430 and the focal ring 440 can be constructed from any appropriate material including Invar, steel alloy, aluminum alloy, and the like.

Figure 8:
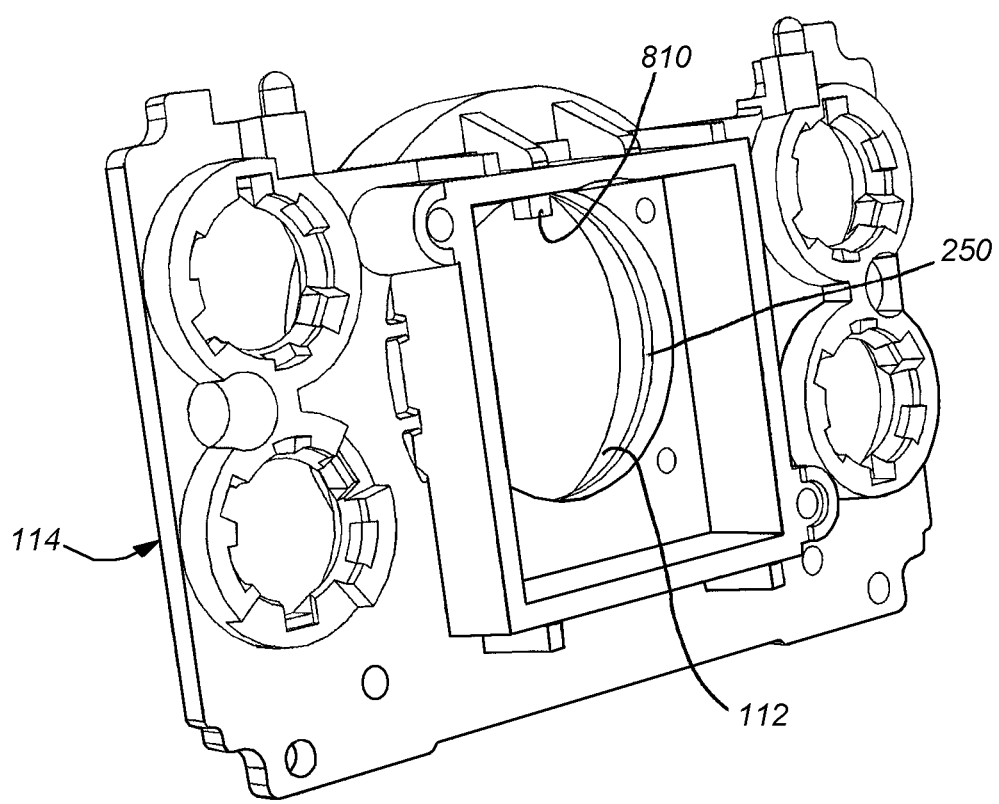
FIG. 8 is a rear perspective view of the camera face and mount detached from the camera body including a guide pin for vertically aligning the profiler assembly with respect to the camera.

In order to ensure that the profiler assembly 120 remains at a predetermined rotational orientation (i.e. in a downward vertical orientation) with respect to the camera axis, the rear end 420 includes a slot 650 (FIG. 6) that cuts through the threads in a non-interrupting manner. Referring to FIG. 8, the front face 114 of the camera includes an illustrative guide pin 810 that closely conforms to the width of the slot 650. During assembly, the lens base 130 is rotationally aligned with the camera body so that the pin 810 passes into the slot as the rear end 420 is driven axially rearwardly into the mount 112. This guide arrangement ensures that a precise and repeatable vertical relationship between the camera body and profiler assembly is maintained during the attachment process and thereafter. In alternate embodiments, the pin can be substituted with another guide mechanism, such as an external guide structure on the mount that engages corresponding structures on the profiler assembly's lens base. Likewise, a temporary guide mechanism, such as a jig can be used to attach the profiler assembly to the camera. Alternatively, the assembly can be attached to the camera using conventional measurement techniques that are generally free of a jig or permanent guide structure.

While the laser unit 150 can define a variety of external form factors and mounting arrangements with respect to the remote end of the bar 140, on possible mounting arrangement includes a set screw 550 (shown in phantom) that is tightened once the laser is seated within the bar mounting hole 552. A variety of alternate permanent or removable mounting arrangements can be employed in alternate embodiments. In this embodiment the bar 140 illustratively defines a front-to-rear thickness TB (FIG. 5) of approximately 6 millimeters and a side-to-side width WB of approximately 20 millimeters. These dimensions are highly variable depending upon the overall size of the profiler assembly and overall length of the bar 140.

Figure 9:
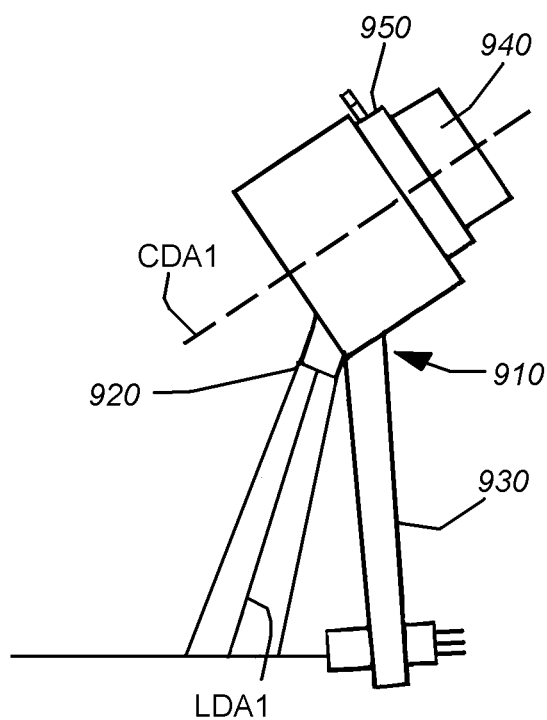
FIG. 9 shows another embodiment of a profiler assembly.

As shown briefly in FIG. 9, another embodiment of a profiler assembly 910 that can be used for smaller focal distances includes a more steeply angled lens 920 of appropriate parameters and a shorter bar 930. Notably, this assembly 910 possesses the same rear end 940 and mounting ring 950 as other available assemblies so that it can be readily attached to a common camera unit with a conforming camera mount. This interchangeability enhances the versatility of the overall system.

In a further embodiment, the mounting ring and/or focal ring can be interchangeable on a common rear end of the assembly so that the assembly can be adapted to a variety of different mount types. For example, a specific ring can allow F mount attachment without changing the lens base rear end geometry or threads. Such a mount can include F mount external threads and the standard rear end internal threads.

With reference to FIG. 1, the camera processor or an external processor can be provided with the specific geometric parameters of the profiler assembly (e.g. the relative angles of axes and the spacing between the laser and the lens) as well as any needed calibration data in order to allow the vision system to more accurately perform the specified profiling task. This information (depicted as block 180) can be stored in the camera memory or at another storage site. It can be provided to the vision system process/processor manually or in an automated manner (e.g. a setup disk that is provided by the manufacturer with the profiler assembly). It should be understood by those of skill that the vision process employed using the assembly 120 can be conventional and/or customized as appropriate to the profiling task.

It should now be clear that the laser profiling assembly according to illustrative embodiments herein provides an effective, straightforward and accurate unit for performing laser profiling on a variety of surfaces. This assembly avoids long setup times and allows a variety of geometric and calibration data to be predetermined, and provided to the user without trial and error experimentation. This assembly can also be provided in a variety of interchangeable models that are specially adapted to a particular profiling task depending upon, for example, the required precision, surface size and focal distance.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the bar can be attached to the lens base using mechanical fastening techniques brazing or welding. Also, the lens can be movable within the lens base to allow fine adjustment of the focal length. Moreover, while not shown, the flange of the mounting ring can include a knurled, or otherwise textured, surface for improved gripping during rotation by a user's hand. Alternatively, the mounting ring can be adapted for rotation by a specialized or conventional tool. Additionally, the lens need not be positioned with a lens axis that is non-parallel (acutely angles) relative to the camera axis, for example in profiling tasks involving a limited vertical range of the field of view. Furthermore, the bar can be any structure that allows the laser axis of projection to be spaced apart from the lens axis. Also, the profiler assembly can include electronic components and appropriate connections for transmitting geometric parameters and/or calibration information that are unique to the assembly directly to the camera and/or vision processor via an appropriate wired or wireless link. Additionally, while the illustrative profiler assembly is adapted to mount onto the camera at a predetermined rotational orientation with respect to the camera optical axis, it is expressly contemplated that the rotational orientation can be arbitrary and/or unknown. In such instances, the vision system software or another mechanism can be employed to rotate the acquired image to an appropriate rotational orientation using known techniques. Accordingly, this description is meant to be taken only by way of example, and not to otherwise limit the scope of this invention.

What is claimed is:

1. An assembly for laser profiling an object surface using a vision system camera having a mount coaxial with a camera axis, the assembly comprising:
   a lens base including a lens having a lens optical axis, the lens base including a rear end having a mounting structure constructed and arranged to removably secure the lens base to the mount; and
   a bar extending from the lens base to a distal end, and
   wherein the distal end is constructed and arranged to support a laser so that an axis of projection of the laser is directed in a predetermined direction with respect to the lens optical axis.

2. The assembly as set forth in claim 1 wherein the lens optical axis is oriented at an acute angle with respect to the camera axis.

3. The assembly as set forth in claim 2 wherein the rear end includes a mounting ring slidably mounted over the rear end that is externally threaded.

4. The assembly as set forth in claim 3 wherein the rear end is externally threaded and includes a focal ring located rearwardly of the mounting ring, the focal ring threadingly engaging external threads of the rear end to allow for variable axial positioning thereof.

5. The assembly as set forth in claim 4 wherein the rear end includes a guide structure that mates with a corresponding structure on the camera so at to maintain the predetermined rotational orientation therebetween.

6. The assembly as set forth in claim 4 wherein external threads of the mounting ring defines a conventional camera mount threads.

7. The assembly as set forth in claim 2 wherein each of the lens base and the bar comprise a unitary structure of a low-thermal-expansion material.

8. The assembly as set forth in claim 2 wherein the lens optical axis is at an angle in a range of between approximately 15 degrees and 50 degrees with respect to the axis of projection of the laser.

9. The assembly as set forth in claim 2 wherein the camera axis is spaced apart along the bar from the axis of projection of the laser approximately 5 to 20 centimeters.

10. The assembly as set forth in claim 2 wherein the lens base is constructed and arranged to mount at a predetermined rotational orientation with respect to the camera axis.

11. The assembly as set forth in claim 10 wherein the rear end is externally threaded and includes a focal ring located rearwardly of the mounting ring, the focal ring threadingly engaging external threads of the rear end to allow for variable axial positioning thereof, and the rear end further includes a guide structure that mates with a corresponding structure on the camera so at to maintain the predetermined rotational orientation therebetween.

12. The assembly as set forth in claim 2 wherein the laser is constructed and arranged to project a diverging beam fan containing a line in a plane perpendicular to a plane defined by the lens optical axis and the axis of projection that also contains the axis of projection.

13. The assembly as set forth in claim 2 wherein the lens includes a band pass filter that substantially attenuates received light in wavelengths other than a wavelength of light projected by the laser.

14. A laser profiling vision system comprising:
   a vision system camera having a mount coaxial with a camera axis and a sensor with an image plane perpendicular to the camera axis;
   a first integral profiler assembly removably mounted to the mount including,
   a lens base including a lens having a lens optical axis, the lens base including a rear end having a mounting structure constructed and arranged to removably secure the lens base to the mount; and
   a bar extending from the lens base to a distal end, and
   wherein the distal end is constructed and arranged to support a laser so that an axis of projection of the laser is directed in a predetermined direction with respect to the lens optical axis.

15. The system as set forth in claim 14 further comprising a second integral profiler assembly constructed and arranged to interchange on the camera with the first integral profiler assembly comprising,
   a lens base including a lens having a lens optical axis, the lens base including a rear end having a mounting structure constructed and arranged to removably secure the lens base to the mount in a predetermined rotational orientation with respect to the camera axis; and
   a bar extending from the lens base to a distal end, and
   wherein the distal end is constructed and arranged to support a laser so that an axis of projection of the laser is directed in a predetermined direction with respect to the lens optical axis.

16. The system as set forth in claim 15 wherein the first integral profiler assembly defines a first geometry and the second integral profiler assembly defines a second geometry dissimilar from the first geometry.

17. A method for arranging a laser profiler comprising the steps of:

providing a vision system camera having a mount coaxial with a camera axis and a sensor with an image plane perpendicular to the camera axis;

removably mounting a first integral profiler assembly having a lens base and a bar with a laser at a distal end in which a lens optical axis and the an axis of projection of the laser are spaced apart along the bar, the step of removably mounting including threadingly engaging a mounting structure of the first integral profiler assembly with the mount.

18. The method as set forth in claim 17 further comprising interchanging in the mount the first integral profiler assembly with a second integral profiler assembly having a lens base and a bar with a laser at a distal end in which a lens optical axis and the an axis of projection of the laser are spaced apart along the bar, wherein the first integral profiler assembly defines a first geometry and the second integral profiler assembly defines a second geometry dissimilar from the first geometry.

19. The method as set forth in claim 17 further comprising transmitting geometrical data and calibration parameters relative to the first integral laser profiler assembly to a vision system processor operatively connected with the vision system camera.

20. The method as set forth in claim 17 further comprising projecting with the laser a diverging beam fan containing a line in a plane perpendicular to a plane defined by the lens optical axis and the axis of projection that also contains the axis of projection.

21. The method as set forth in claim 17 further comprising attenuating with a band pass filter light received by the vision system camera in wavelengths other than a wavelength of light projected by the laser.

* * * * *